2,751,371
SULFUR VULCANIZABLE RUBBER STABILIZED WITH A REACTION PRODUCT OF AN ALKYL-ARYLOXY PHOSPHORUS DICHLORIDE AND A SECONDARY AMINE

John C. Bill, Middlebury, Conn., assignor to United States Rubber Company, New York, N. Y., a corporation of New Jersey No Drawing. Application October 16, 1953, Serial No. 386,650

7 Claims. (Cl. 260—45.9)

This invention relates to a new class of heat, and light stabilizers for natural rubber and unsaturated synthetic rubbers of the sulfur-vulcanizable type, more particularly those which are rubbery conjugated diene polymers and copolymers exemplified by the butadiene-styrene (GR–S) and butadiene-acrylonitrile (GR–N or Paracril) rubbers.

An object of the invention is to provide stabilizers for such rubbers which will not only stabilize against the deteriorating influence of heat, and light, but which will impart little or no discoloration to the product, which is especially advantageous with light or white goods. Other objects will be apparent from the hereinafter description.

The stabilizers are composite reaction products resulting from reacting one mole proportion of an alkylaryloxy phosphorus dichloride with at least two to four mole proportions of a non-aromatic secondary amine, namely, an aliphatic or heterocyclic secondary amine. The stabilizer is used in small proportions, generally ranging from about 0.1 to about 5.0%, based on the rubber.

The following examples are given to illustrate the invention; parts are by weight:

Example 1

Phosphorus trichloride (700 gms.; 5.09 mol.) was poured into a three-liter, three-necked flask equipped with stirrer, pot thermometer, and condenser with drying tube. To this, 2,4-di-tert.-butyl-5-methylphenol (476 gms.; 2.16 mol.) was added and the mixture allowed to stir overnight. The excess phosphorus trichloride was then topped off and the residue distilled under vacuum.

| Fract. | B. P., °C. | Pressure | Wt., g. |
|---|---|---|---|
| 1 | 124 | .5 | |
| 2 | 124–126 | .5 | 693 |
| Residue | | | 127 |

Mono-(2,4-di-tert.-butyl-5-methylphenoxy) phosphorus dichloride (fract. 2) (50 gms.; .157 mol.) was mixed with 100 cc. of anhydrous ether in a one-liter three-necked flask equipped with reflux condenser and drying tube, stirrer and additional funnel. Diisopropylamine (57 gms.; .564 mol.) was added at such a rate that the mixture refluxed slowly. The mixture was then filtered, washed with water and the solvents removed by vacuum distillation. There remained a very viscous colorless liquid, which, on trituration with acetone, gave a white colorless solid (M. P. 145–6° C.). This gave a phosphorus analysis of 9.15% and a nitrogen analysis of 4.02%.

Example 2

Mono-(2,4-di-tert.-butyl-5-methylphenoxy) phosphorus dichloride (46.7 gms.; .146 mol.) was dissolved in 100 cc. of anhydrous ether in a 500 cc. three-necked flask equipped with additional funnel, stirrer and condenser. Dibtuylamine (75.3 gms.; .583 mol.) in 100 cc. of anhydrous ether was added dropwise with stirring and cooling. The reaction mixture was stirred at room temperature for two hours and for two hours at the reflux temperature of ether. The mixture was then filtered and the filtrate washed with water. The ether was then removed by distillation and the remaining material dried by an azeotropic distillation with benzene. The material was topped to 90° C./30 mm. There remained a light, semi-crystalline solid analyzing 7.8% phosphorus.

Example 3

Diisopropylamine (65 gms.; .643 mol.) was dissolved in anhydrous ether (100 cc.) and added to a cooled solution of di-nonylphenoxy phosphorus dichloride (65 gms.; .146 mol.) in anhydrous ether (150 cc.). The reaction mixture was allowed to stand for three hours at room temperature and then filtered. The filtrate was washed with 0.1 percent hydrochloric acid and with water. The ether layer was then dried with anhydrous sodium sulfate. The other was then removed by distillation under vacuum. There remained 75 g. of a yellow liquid having a phosphorus analysis of 6.28%.

Example 4

Piperidine (85 gms.; 1 mol.) dissolved in anhydrous ether (250 cc.), was added slowly, with cooling and stirring to a solution of nonylphenoxy phosphorus dichloride (75 gms.; .234 mol.) dissolved in 200 cc. of anhydrous ether. The resulting mixture was stirred for fourteen hours, filtered and the filtrate extracted once with dilute hydrochloric acid and three times with water. The ether was dried overnight with anhydrous sodium sulfate. The ether was then removed under diminished pressure (water aspirator) leaving a reddish brown oil which had no odor of piperidine. It analyzed 6.13% phosphorus.

Example 5

Nonylphenoxy phosphorous dichloride (75 g.; .234 moles) was dissolved in 100 cc. of ether. To this a solution of di-n-butylamine (60.5 gms.; .468 moles) in ether (50 cc.) was added dropwise with cooling and stirring. After the addition was complete the solution was filtered, washed with water and dried over sodium sulfate. The ether was then removed, leaving 58.7 gms. of a light colored product containing 4.55% phosphorous.

Example 6

To test the compounds as GR–S stabilizers, 1.5 parts of the stabilizer, 2 parts solvent naphtha and 5 drops of oleic acid were mixed in a high speed mixer with 50 parts of water, 1 part of 12.3 percent caustic soda and 5 drops of oleic acid. The resulting emulsion was added to sufficient latex of a copolymer of butadiene-styrene (71/29) to give 100 gms. of dry polymer. The latex was then flocculated, the polymer dried overnight at 80° C., milled and placed in an oven at 130° C. The time for resinification was noted.

REACTANTS

| | Amine | Phenoxy Phosphorus Dichloride (p. p. d.) | Resinification Time, 130° C. (Hrs.) |
|---|---|---|---|
| 1. | Diisopropylamine | 2,4 - di - tert. - butyl - 5 - methyl-p.p.d. | 11 |
| 2. | Diisopropylamine | nonyl-p.p.d. | 25 |
| 3. | Piperidine | nonyl-p.p.d. | 7 |
| 4. | Piperidine | 2,4 - di - tert. - butyl - 5 - methyl-p.p.d. | 5 |
| 5. | Di-n-butylamine | nonyl-p.p.d. | 7 |
| 6. | Di-n-butylamine | 2,4 - di - tert. - butyl - 5 - methyl-p.p.d. | 6 |
| 7. | Diisopropylamine | dinonyl-p.p.d. | 9 |
| 8. | Blank | | ½ |

Example 7

To show the light stabilizing power of these chemicals, samples of the milled polymer (see Example 6) were placed in the sunlight and the discoloration and degradation were noted after five weeks' exposure.

| Amine | Phenoxy Phosphorus Dichloride (p.p.d.) | Result |
| --- | --- | --- |
| 1. Blank | | Severely checked. |
| 2. Diisopropylamine | 2,4 - di - tert. - butyl - 5 - methyl-p.p.d. | No checking. |
| 3. Piperidine | nonyl-p.p.d. | Very slight checking. |
| 4. Diisopropylamine | di-nonyl-p.p.d. | Do. |
| 5. Di-n-butylamine | 2,4 - di - tert. - butyl - 5 - methyl-p.p.d. | Do. |

Example 8

To the latex of the emulsion copolymerization of butadiene and acrylonitrile (65/35) 2.0 parts of stabilizer were added (based on 100 parts dry polymer) and the latices were flocculated, dried and sheeted out on a mill. Samples were placed in the window and the time for surface cracking noted. Other samples were held at 130° C. for heat resinification tests. The following data were obtained:

| | 130° C. (Hrs.) | Sunlight (Wks.) |
| --- | --- | --- |
| 1. Reaction product of 2,4-di-tert.-butyl-5-methyl phenoxy phosphorus dichloride and diisopropylamine | 10 | 3+ |
| 2. Reaction product of nonyl phenoxy phosphorus dichloride and dibutyl amine | 7 | 3+ |
| 3. Control | 2.5 | 1 |

Examples of other amines that may be used for reacting with the alkylaryloxy phosphorus dichloride are:

Dimethylamine, diethylamine, di-n-propylamine, di-n-amylamine, di-isoamylamine, di-tert.-amylamine, di-n-hexylamine, di-2-hexylamine, di-octylamine, di-dodecylamine, morpholine, pyrrolidine, diallylamine, dimethallylamine.

Examples of other phenols that may be used in preparing the alkylaryloxy phosphorous dichloride are:

Octyl phenol, dodecyl phenol, propyl phenol, butyl phenol, phenol, cresol, di-octyl phenol, di-butyl phenol, di-methyl phenol, methyl-tert.-butyl phenol, methyl octyl phenol, methyl nonyl phenol, aryl propyl phenol, trimethyl phenol.

Other elastomers than those above mentioned, which may be preserved by the present chemical stabilizers, are the rubbery polymerizates of isoprene, butadiene-1,3, piperylene; also the rubbery copolymer of conjugated dienes with one or more polymerizable monoolefinic compounds which have the capability of forming rubbery copolymers with butadiene-1,3, outstanding examples of such monoolefinic compounds being those having the group $CH_2=C<$, exemplified by styrene. Examples of such monoolefines are styrene, vinyl naphthylene, alpha methyl styrene, para-chloro styrene, dichloro styrene, acrylic acid, methyl acrylate, methyl methacrylate, methacrylonitrile methacrylamide, methyl vinyl ether, methyl vinyl ketone, vinylidine chloride, vinyl carbazole, vinyl pyridines, alkyl substituted vinyl pyridines.

Having thus described my invention, what I claim and desire to protect by Letters Patent is:

1. An unsaturated sulfur-vulcanizable elastomeric composition containing as a stabilizer therefor, a product of reaction of from 2 to 4 molecular proportions of a C-alkylaryloxy phosphorus dichloride and 1 molecular proportion of a non-aromatic secondary amine selected from the class consisting of aliphatic and heterocyclic secondary amines.

2. A composition as set forth in claim 1 in which the elastomer is selected from the class consisting of rubbery polymerizates of conjugated dienes, and rubbery copolymers of such dienes with monoolefinic compounds containing the group $CH_2=C<$.

3. A composition as set forth in claim 2 in which the stabilizer is a product of reaction of diisopropylamine and 2,4-di-tert.-butyl-5-methyl phenoxy phosphorus dichloride.

4. A composition as set forth in claim 2 in which the stabilizer is a product of reaction of diisopropylamine and nonyl-phenoxy phosphorus dichloride.

5. A composition as set forth in claim 2 in which the stabilizer is a product of reaction of piperidine and nonyl-phenoxy phosphorus dichloride.

6. A composition as set forth in claim 2 in which the stabilizer is a product of reaction of piperidine and 2,4-di-tert.-butyl-5-methyl phenoxy phosphorus dichloride.

7. A composition as set forth in claim 2 in which the stabilizer is a product of reaction of diisopropylamine and dinonyl phenoxy phosphorus dichloride.

References Cited in the file of this patent

UNITED STATES PATENTS 2,441,331    Reiff et al. _____ May 11, 1948